United States Patent [19]

Posso

[11] 4,314,637
[45] Feb. 9, 1982

[54] CASE FOR PACKING A TAPE CASSETTE OR THE LIKE

[76] Inventor: Patrick Posso, 10, avenue Jurigoz, Lausanne, Switzerland, CH-1006

[21] Appl. No.: 147,519

[22] Filed: May 7, 1980

[30] Foreign Application Priority Data

May 14, 1979 [FR] France ................................ 79 12220

[51] Int. Cl.³ ...................... B65D 85/67; B65D 43/16
[52] U.S. Cl. ................................. 206/387; 206/1.5; 220/306; 220/334; 220/339
[58] Field of Search .................. 206/387, 1.5; 220/339, 220/306, 334

[56] References Cited

U.S. PATENT DOCUMENTS

| | | | |
|---|---|---|---|
| 3,412,890 | 11/1968 | Rich | 220/334 |
| 3,532,211 | 10/1970 | Gellert | 206/387 |
| 3,904,074 | 9/1975 | Hoffman et al. | 220/339 |
| 4,253,572 | 3/1981 | Halbich | 220/306 |

Primary Examiner—William T. Dixson, Jr.
Attorney, Agent, or Firm—James E. Nilles

[57] ABSTRACT

The present invention relates to an improved case for packing a tape cassette or the like, wherein the case comprises, on the one hand, a transparent element presenting a bottom, a rear wall and two side walls extending over the whole of its width and, on the other hand an opaque element presenting a top, a front edge portion and side walls, this opaque element comprising two portions and side walls, this opaque element comprising two portions connected together by a hinge integral with and extending in the top parallel to the front edge portion, continuing through the side walls by separating slits so that the rear opaque portion and the transparent element cooperate to form a rigid body when their side walls are connected together, while the front portion forms a cover whose side walls cooperate with those of the transparent element by elastic locking means.

5 Claims, 5 Drawing Figures

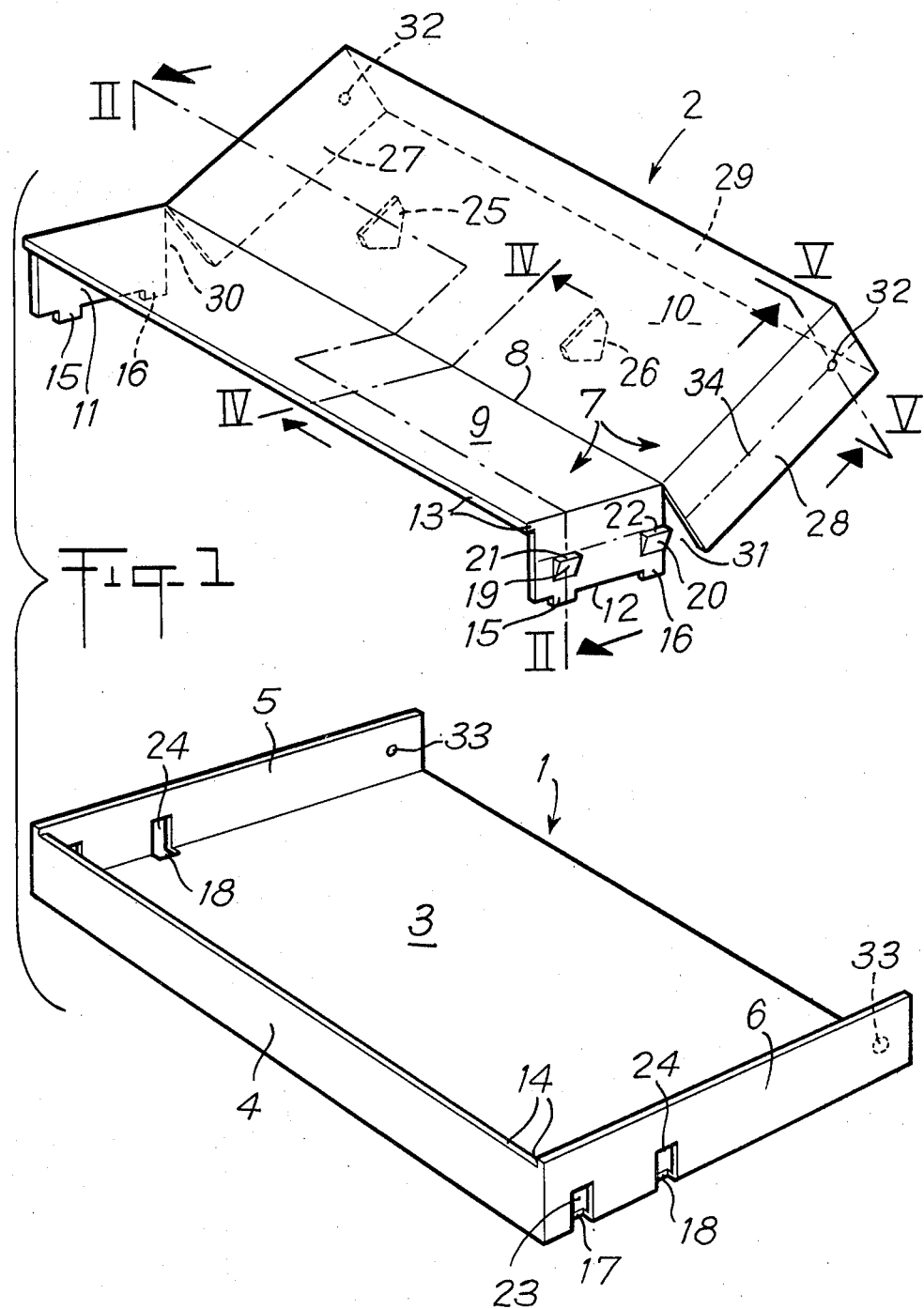

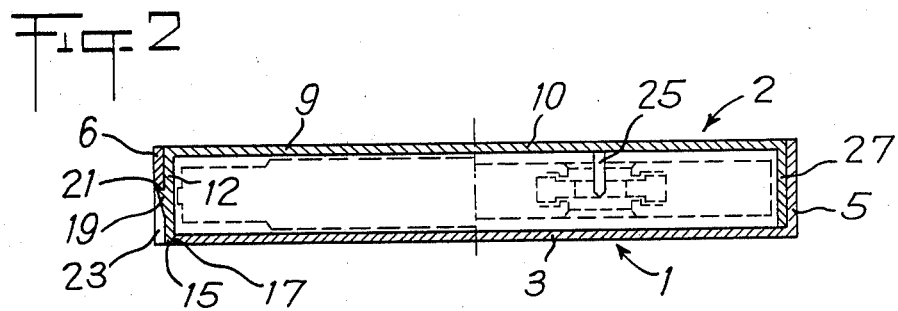
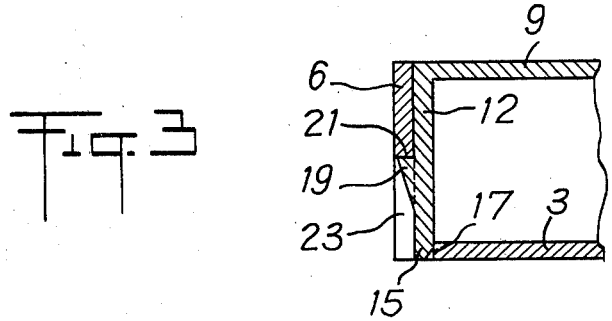
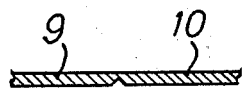 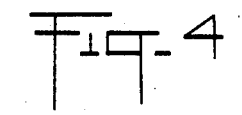
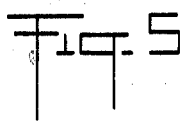 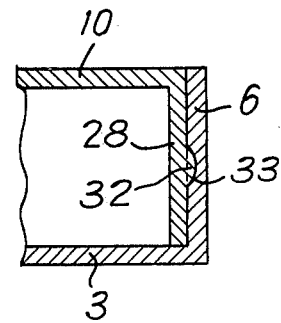

CASE FOR PACKING A TAPE CASSETTE OR THE LIKE

The present invention relates to an improved case for a tape cassette of the twin reel type or for a similar item.

The most widely known case which is closest to the invention comprises an opaque element that forms a cover and has integral lugs projecting down from its top for immobilising the reels of the cassette by penetrating into their notched hubs; said top is surrounded on three sides by edge portions constituting two side walls connected by a front edge portion. This known case also comprises a transparent element forming a body portion and presenting a bottom a back wall, two side walls and a trapezoidal portion parallel to the bottom, which define a receptacle for the tape cassette to be protected. The two side walls of the body portion are disposed inside and against the side walls of the cover; they are pivoted by means of lugs integral with said cover side walls and penetrating in holes in said body side walls, so that the case may be opened by pivoting.

It is important to note that the top of the opaque cover defines a gap whose shape is complementary of that of the trapezoidal portion and side walls of the body portion, so that, when the case is in closed position, the thickness thereof is minimum and no part of the body portion projects with respect to the cover.

A first drawback of this known case resides in the fact that, when closing it, the user's fingers risk getting pinched in the passage defined between the edges of the trapezoidal portion of the body and of the corresponding gap in the cover.

A second drawback resides in the complexity of the mould which is in three parts that must move in different directions.

It is an object of the present invention to remedy these drawbacks by facilitating opening of the case, ensuring the locking of its closure and avoiding any pinching of the fingers or jamming of a foreign body; at the same time, it simplifies the design of the mould which is now only in two parts; however, it respects the major imperative that one face and one back wall of the case must be transparent in order to enable the indications written on the cassette to be read, whether the case is stored flat or upright.

To this end, the case comprises, on the one hand, an opaque element which presents a top having integral reel immobilising lugs and edge portions constituting two side walls connected by a front edge portion, and on the other hand, a transparent element which presents a bottom integral with a rear wall and side walls extending against the side walls of the opaque element and pivoted with respect thereto.

In accordance with the invention, the improvements further reside:

in that this opaque element comprises two portions connected together, in manner known per se, by a hinge integral with and extending in the top parallel to the front edge portion, continuing through the side walls by separating slits, the opening part being fast with the reel immobilising lugs;

in that the rear opaque portion and the transparent element are connected together by possibly dismountable connecting means to form a rigid body;

and in that the front portion forms a cover bearing the cassette and whose side walls cooperate with those of the transparent element by elastic locking means.

U.S. Pat. Nos. 3,532,211 and 3,978,985 and French Patent Application No. 2 189 811 relate to cases for tape cassettes, similar to the one described hereinbefore. Mention should be made of French Pat. No. 1,319,370, which relates to a box for packing pharmaceutical products. To facilitate removal from this box of the tablets or pastilles contained therein, the lid is pliable; however, the application of this pliable lid to a case for tape cassette requires, as is the case in the invention, on the one hand that the fixed part of the lid be connected to the rest in order to form a rigid casing, on the other hand that the opening part of this lid be provided with lugs for immobilising the reels of the tape cassette and with elastic locking means.

The opaque element is preferably made of a polypropylene and the transparent element of a crystal polystyrene.

According to a particularly advantageous embodiment, each side wall of the rear opaque part has at least one clipping tooth, known per se, projecting from its outer face, whose inclined ramp widens upwardly, terminating in a stop shoulder and which cooperates, for locking thereof, with a window, known per se but made in the corresponding side wall of the transparent element; moreover, each side wall of this rear opaque part has at least one tongue projecting from its lower edge, adapted to penetrate in a slot made thereopposite in the bottom of the transparent element.

The invention will be more readily understood from the following description with reference to the accompanying drawings, in which:

FIG. 1 is an exploded perspective view of the improved case according to the invention.

FIG. 2 is a longitudinal section through the case taken along line II—II of FIG. 1.

FIG. 3 is an enlarged view in detail illustrating the clipping means of FIG. 2.

FIG. 4 is a partial transverse section of the hinge taken along line IV—IV of FIG. 1.

FIG. 5 is a partial longitudinal section of the means for locking the cover, shown on a larger scale and taken along line V—V of FIG. 1.

Referring now to the drawings, FIG. 1 shows the case according to the invention which comprises a transparent element 1 moulded from a crystal polystyrene for example and an opaque element 2 moulded from polypropylene or other plastics material.

The transparent element 1 presents a bottom 3 fast with a rear wall 4 and two side walls 5 and 6, constituting three visible edge portions of the case.

The opaque element 2 presents a one-piece top 7 but in which a line of weakening is marked in the form of a groove in order to define a hinge 8 connecting front and rear (as seen in FIG. 1) portions 9 and 10 respectively.

The portion 9 of the top is provided with two side walls 11 and 12 adapted to be closely received between the side walls 5 and 6 of the transparent element 1, abutting against the rear wall 4 thereof. Normally, these side walls 5 and 11, 6 and 12 are connected together by any suitable means; in this position, the transparent element 1 and the combined opaque portion 9,11,12 constitute the body of the case in which a tape cassette may be slidably inserted and thus tidied away. In this same position and to rigidify the body, a projecting edge 13 on the top portion 9 overlaps the visible edge of a marginal recess 14 in the rear wall 4.

In the example shown, the opaque portion 9,11,12 is connected to the transparent element 1, in order to constitute the body, by clipping them together (FIGS. 1 and 3). In this example, each of the side walls 11 and 12 of this opaque portion has two centering tongues 15 and 16 projecting from the lower edge thereof, adapted to penetrate in slots 17 and 18 respectively, made in the bottom 3 of the transparent element 1 near the contiguous side wall 5 or 6; in addition, each of these side walls 11 and 12 of the opaque portion 9 has two clipping teeth 19 and 20 projecting from the outer face thereof, whose inclined ramps widen progressively upwardly towards the portion 9 to terminate in stop shoulders 21 and 22, these teeth cooperating with windows 23 and 24 made in the corresponding side wall 5 or 6 of the transparent element 1; the teeth 19 and 20 are preferably located opposite the tongues 15 and 16, this enabling the windows 23 and 24 to communicate with the slots 17 and 18 and consequently enabling them to be made more easily by moulding. Of course, one tooth and one tongue only may be provided on the side wall 12 and on side wall 11; furthermore, the tongues may be sealable, in which case the teeth may be eliminated; on the other hand, the teeth may be of two-directional action and, in that case, the teeth are no longer indispensable. However, the embodiment described with reference to the drawing appears to be the most advantageous, not only from the point of view of efficiency, but also from the point of view of simplified manufacture, as is set forth hereinafter.

The top portion 10 is provided with lugs 25 and 26 integral therewith, adapted to penetrate into the notched hubs of the reels to immobilise them; it is also fast with edge portions constituting two side walls 27, 28 and a front edge portion 29 connecting them. Slits 30 and 31 extend the hinge 8 and separate the side walls 11 and 12 of the opaque portion 9 from the side walls 27 and 28 of the opaque portion 10. Consequently, this portion 10 constitutes a pivoting cover which, when it is open, enables the tape cassette to be removed and returned and, when it is closed, imprisons said cassette by immobilising the reels thereof by means of lugs 25 and 26; the shape of the case is such that the cover cannot pinch the user's fingers.

Furthermore, elastic locking means ensure that the cover 10,25 to 29 is maintained in closed position on body 1, 3 to 9 and 11 to 24. In the example shown, these means are constituted by detents 32 integral with and projecting from the outer face of the side walls 27 and 28 of the top portion 10, i.e. the cover, in the vicinity of the front edge portion 29; these detents cooperate with detent recesses 33 made there-opposite in the side walls 5 and 6 of the transparent element 1, i.e. of the body.

It is important to note that the mould for the opaque element 2 is in two parts only; however, the plane of parting 34 of these parts coincides with the shoulders 21, 22 of the clipping teeth, extends parallel to the top 7 and passes through the centre of the detents 32.

The invention is not limited to the embodiment shown and described in detail hereinabove, as various modifications may be made thereto without departing from the scope thereof.

The case forming the subject matter of the present invention is applicable to the packing of tape cassettes or other means for storing information of the twin-reel type, in the domains of recording of sound, video, data, etc...

What is claimed is:

1. A case for a tape cassette, comprising:
A. a substantially transparent bottom member formed in one piece and having
   (1) a bottom wall,
   (2) an upright rear wall,
   (3) opposite upright and parallel side walls,
   (4) at least one window in each of said side walls, near the rear wall and spaced therefrom and extending down to the bottom of the side wall, and
   (5) at least two shallow slots in said bottom wall, one at each side thereof, each opening outwardly to one of said windows;
B. a top member formed in one piece and having
   (1) a top wall,
   (2) a downwardly projecting front wall, and
   (3) opposite, parallel, downwardly projecting side walls spaced apart by a distance to be closely receivable between the side walls of the bottom member and each of which has a slit that extends through its full height and divides it into front and rear portions,
   (4) said top wall having a laterally extending groove aligned with said slits that provides a hinge whereby a front portion of the top member can swing up and down relative to the rear portion thereof;
C. integral means on the top member for securing the same to the bottom member, said integral means comprising
   (1) a tooth projecting sidewardly outwardly from each of said side wall rear portions and closely receivable in one of said windows, and
   (2) a tongue projecting edgewise downwardly from each of said side wall rear portions and closely receivable in one of said slots; and
D. cooperating detent means on the side walls of said members for releasably confining the front portion of said top member against swinging out of a closed position, said detent means comprising a protuberance on each side wall of one of said members projecting towards the adjacent side wall of the other member and receivable in a depression in said adjacent side wall, said detent means being located near said front wall.

2. The case of claim 1 wherein each of said teeth has an upwardly facing top surface that engages under an upper edge of a window, and each tooth tapers downwardly and sidewardly inwardly from said top surface to have an inclined ramp surface.

3. The case of claim 1 wherein said bottom member is made of a clear polystyrene and said top member is made of a polypropylene.

4. The case of claim 1, further characterized by:
E. a pair of integral downwardly projecting lugs on the front portion of said top wall, each receivable in one of a pair of reel openings of a cassette received in the case, to immobilize the reels.

5. The case of claim 1, further characterized by:
(1) the top edge of said rear wall being spaced below the top edges of the side walls of the bottom member by a distance equal to the thickness of said top wall, and
(2) said top wall projecting rearwardly beyond the side walls of said top member to overlie the top edge of said rear wall.

* * * * *